United States Patent
Factor et al.

(10) Patent No.: US 7,035,978 B2
(45) Date of Patent: Apr. 25, 2006

(54) METHOD, SYSTEM, AND PROGRAM FOR POLICIES FOR IMPROVING THROUGHPUT IN REMOTE MIRRORING SYSTEMS

(75) Inventors: Michael E. Factor, Haifa (IL); Shachar Fienblit, Ein Ayala (IL); Joseph Smith Hyde, II, Tucson, AZ (US); Thomas Charles Jarvis, Tucson, AZ (US); William Frank Micka, Tucson, AZ (US); Gail Andrea Spear, Tucson, AZ (US); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 10/387,962

(22) Filed: Mar. 11, 2003

(65) Prior Publication Data
US 2004/0181632 A1    Sep. 16, 2004

(51) Int. Cl.
*G06F 12/08*    (2006.01)

(52) U.S. Cl. .................. 711/133; 711/129; 711/128
(58) Field of Classification Search ............... 711/133, 711/134, 136, 156, 171, 172, 129, 128
See application file for complete search history.

(56) References Cited

U.S. PATENT DOCUMENTS

| | | | |
|---|---|---|---|
| 4,536,836 A | | 8/1985 | Dodd et al. |
| 5,943,687 A | * | 8/1999 | Liedberg ............... 711/156 |
| 6,003,114 A | | 12/1999 | Bachmat |
| 6,101,588 A | | 8/2000 | Farley |
| 6,141,731 A | * | 10/2000 | Beardsley et al. ......... 711/136 |
| 6,189,079 B1 | | 2/2001 | Micka et al. |
| 6,272,598 B1 | * | 8/2001 | Arlitt et al. ............... 711/133 |
| 6,275,897 B1 | | 8/2001 | Bachmat |
| 6,327,644 B1 | * | 12/2001 | Beardsley et al. ......... 711/136 |
| 6,425,058 B1 | * | 7/2002 | Arimilli et al. ........... 711/134 |
| 6,434,669 B1 | * | 8/2002 | Arimilli et al. ........... 711/128 |
| 6,510,493 B1 | * | 1/2003 | Liu et al. .................. 711/133 |
| 6,848,026 B1 | * | 1/2005 | DeSota et al. ............ 711/129 |

OTHER PUBLICATIONS

J.A. Pershing et al., "Improving Most Recently User Change Prefetching", IBM Corp., Technical Disclosure Bulletin, vol. 36, No. 08, Aug. 1993, pp. 437-442.

* cited by examiner

*Primary Examiner*—Pierre-Michel Bataille
(74) *Attorney, Agent, or Firm*—Janaki K. Davda; Konrad Raynes & Victor LLP

(57) ABSTRACT

Disclosed is a method, system, and program for determining which data to remove from storage. A first policy is used to determine when to remove a block of data of a first type. A second policy is used to determine when to remove a block of data of a second type.

27 Claims, 8 Drawing Sheets

METHOD, SYSTEM, AND PROGRAM FOR POLICIES FOR IMPROVING THROUGHPUT IN REMOTE MIRRORING SYSTEMS

BACKGROUND OF THE INVENTION

1. Field of the Invention

The present invention is directed to policies for improving throughput in remote mirroring systems, such as peer to peer remote copy.

2. Description of the Related Art

Disaster recovery systems typically address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides several remote mirroring systems, including, for example: a synchronous Peer-to-Peer Remote Copy (PPRC®) service and a PPRC® Extended Distance service in an Enterprise Storage Server (ESS) system.

The synchronous PPRC® service provides a technique for recovering data updates that occur between a last, safe backup and a system failure. Such data shadowing systems can also provide an additional remote copy for non-recovery purposes, such as local access at a remote site.

With the synchronous PPRC® service, a primary storage subsystem maintains a copy of predefined datasets on a secondary storage subsystem. The copy may be used for disaster recovery. Changes to data are copied to the secondary storage subsystem as an application updates the data. Thus, the copy may be used whether there are gradual and/or intermittent failures. The copy is maintained by intercepting write instructions to the synchronous PPRC® dataset and generating appropriate write instructions from the primary storage system to the secondary storage system. The write instructions may update data, write new data, or write the same data again.

The synchronous PPRC® service copies data to the secondary storage subsystem to keep the data synchronous with a primary storage subsystem. That is, an application system writes data to a volume and then transfers the updated data over, for example, Enterprise System Connection (ESCON®) fiber channels to the secondary storage subsystem. The secondary storage subsystem writes the data to a corresponding volume. Only when the data is safely written to volumes at both the primary and secondary storage subsystems does the application system receive assurance that the volume update is complete.

With synchronous PPRC®, the copy at the secondary storage subsystem is maintained by intercepting write instructions to the dataset at the primary storage subsystem and generating appropriate write instructions from the primary storage system to the secondary storage system.

PPRC® Extended Distance service does not write to secondary storage subsystem before acknowledging the write to the primary. Instead, for the PPRC® Extended Distance service, when a track is written, information is stored that indicates that the track is to be transferred to the secondary storage subsystem at a later time. An asynchronous process collects updates at the primary storage subsystem and sends the updates to the secondary storage subsystem.

In some cases, a first track is removed from cache at the primary storage subsystem to make room for a second track before the first track is written to the secondary storage subsystem. In such a case, the first track is later read back into cache at the primary storage subsystem and then is transferred to the secondary storage subsystem. Removing the first track from cache and later reading the first track back into cache for transfer is inefficient. Thus, there is a need in the art for cache policies for improved throughput in remote mirroring systems, such as peer to peer remote copy.

SUMMARY OF THE INVENTION

Provided are a method, system, and program for determining which data to remove from storage. A first policy is used to determine when to remove a block of data of a first type. A second policy is used to determine when to remove a block of data of a second type.

In additional implementations, it is determined that a block of data is to be demoted from a first storage. If the block of data to be demoted is to be transferred to the second storage and a number of normal blocks of data residing in the first storage equals or exceeds a threshold, removal of the block of data is deferred. If the block of data to be demoted is to be transferred to the second storage and the number of normal blocks of data residing in the first storage are less than a threshold, the block of data is demoted. If the block of data to be demoted is not to be transferred to the secondary storage, the block of data is demoted.

The described implementations of the invention provide a method, system, and program for policies for improved throughput in remote mirroring systems, such as peer to peer remote copy.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
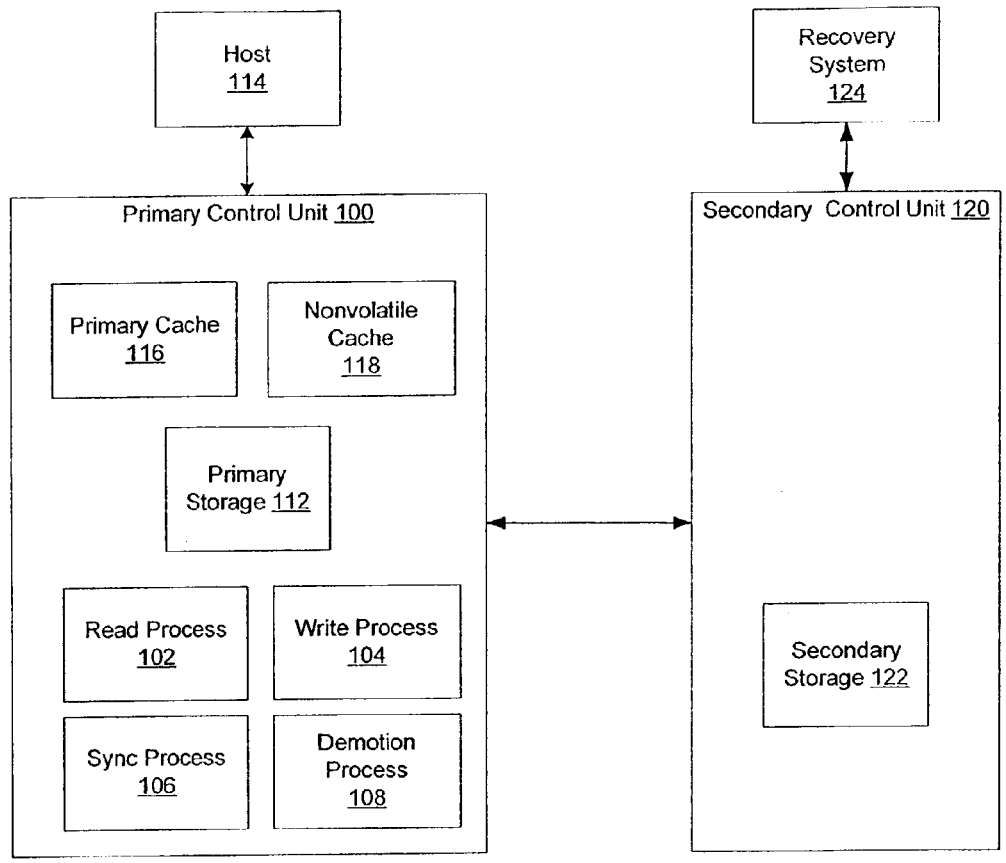
FIGS. 1A and 1B illustrate, in block diagrams, a computing environment in accordance with certain implementations of the invention.
Figure 1B:
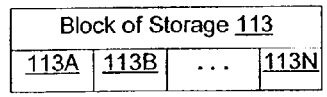

FIGS. 1A and 1B illustrate, in block diagrams, a computing environment in accordance with certain implementations of the invention. A primary control unit 100 provides one or more hosts 114 access to primary storage 112, such as Direct Access Storage Device (DASD). The primary storage 112 may be divided into blocks of storage 113 containing blocks of data, and the blocks of storage 113 are further divided into sub-blocks of storage (113A–113N, where N may be any number) that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The primary control unit 100 includes a primary cache 116 in which updates to tracks in the primary storage 112 are maintained until written to primary storage 112 (i.e., the tracks are destaged). Primary cache 116 may be any type of storage, and the designation of cache illustrates only certain implementations. Additionally, the primary control unit 100 includes a nonvolatile cache 118. The non-volatile cache 118 may be, for example, a battery-backed up volatile memory, to maintain a non-volatile copy of data updates.

The primary control unit 100 includes a read process 102 for reading data, and a write process 104 for writing data. The primary control unit 100 also includes a sync process 106 for transferring data from the primary control unit 100 to remote storage, such as storage at the secondary control unit 120. In certain implementations, the sync process 106 may perform synchronization of data for the synchronous PPRC® and for PPRC® Extended Distance. In such cases, the sync process 106 runs continuously for PPRC® Extended Distance, and starts up and completes for host writes for the synchronous PPRC®. In certain implementations, there may be multiple sync processes (e.g., different sync processes for synchronous PPRC® and for PPRC® Extended Distance or one sync process for each volume on primary storage 112 for PPRC® Extended Distance). Moreover, the primary control unit 100 includes a demotion process 108 for demoting tracks.

In certain implementations, the read process 102, write process 104, sync process 106, and demotion process 108 are implemented as firmware. In certain implementations, the read process 102, write process 104, sync process 106, and demotion process 108 are implemented as separate software programs for each process 102, 104, 106, and 108. In certain implementations, read process 102, write process 104, sync process 106, and/or demotion process 108 may be combined with each other or other software programs (e.g., the read process 102 and write process 104 may be combined with each other).

Secondary control unit 120 provides one or more recovery systems 124 access to disk storage, such as secondary storage 122, which maintains back-up copies of all or a subset of the volumes of the primary storage 112. Secondary storage may be a Direct Access Storage Device (DASD). Secondary storage 122 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks.

For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage, such as secondary storage 122) may be used to maintain back-up copies of all or a subset of the primary storage 112, and the techniques of the invention transfer data to the removable storage rather than to the remote storage. The removable storage may reside at the primary control unit 100.

In certain implementations, the primary control unit 100 and secondary control unit 120 may be comprised of the IBM 3990, Model 6 Storage Controller, Enterprise Storage Server, or any other control unit known in the art.

In certain implementations, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain implementations of the invention, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include Volume1 and Volume2, and secondary storage 122 may contain corresponding Volume1 and Volume2. A primary storage controller may be provided to control access to the primary storage and a secondary storage controller may be provided to control access to the secondary storage.

In certain implementations, the primary control unit 100 and secondary control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

In certain implementations, the primary storage 112 and secondary storage 122 are physically divided into tracks, which are physically divided into sectors. Although the examples herein refer to dividing storage physically into tracks and sectors, the technique of the invention is applicable to any division of storage.

Using the primary cache 116 of fast memory to store tracks from primary storage 112, the primary control unit 100 is able to operate at speeds that are orders of magnitude higher than the speeds available from accessing the primary storage 112 for the tracks. For a read operation, this is possible because input/output (I/O) operations tend to be clustered around the same locations, and it is possible to anticipate which tracks are best to have in primary cache 116. For a write operation, this is possible due to the capability of the primary cache 116 to buffer write operations, and is especially effective in situations of "burst" writes. A burst write refers to writing of a sequence of data counted as one unit in accordance with some specific criterion or measure.

Initially, host 114 writes data to a track in primary cache 116. Write operations modify the track in primary cache 116 synchronously (i.e., writing host 114 waits for the operation to complete), and then, in a background process, primary cache 116 content is written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. In most cases, destage occurs prior to demotion. Copying all or a portion of a track from primary storage 112 to primary cache 116 is a staging operation. Creating a track in primary cache 116 is a promotion operation and involves creating a directory entry. A promotion operation can happen without a stage operation. One example would be when a track not previously in primary cache 116 is written to primary cache 116 by a host 114.

For synchronous PPRC®, before the host 114 completes writing a chain of tracks to the primary control unit 100, all tracks in the chain must have also been transferred to the secondary control unit 120. In certain implementations, this transfer would be accomplished by a synchronization process (e.g., sync process 106), which must have completed before an acknowledgment of completion of the write process is sent to the host 114.

For PPRC® Extended Distance, the host 114 will complete writing a track to the primary control unit 100 without the track having been sent to the secondary control unit 120. After the track has been written to the primary control unit 100, the sync process 106 will discover that an indicator corresponding to the track is set to indicate that the track is out of sync with a corresponding track at the secondary control unit 120 and will send the track to the secondary control unit 120. That is, the track is sent asynchronously with respect to the track written by the host.

When accessing a track, a directory is used to determine whether the track is in primary cache 116. If the track is in the primary cache 116, the directory will include an entry indicating the location of the track. If the track is not in the primary cache 116, the directory will not have an entry for that track, and the track will be promoted. When a track has been demoted, the entry in the directory for the demoted track is removed.

Primary cache 116 memory is smaller than the total size of disk storage. Therefore, one or more tracks that are in the primary cache 116 may be removed, for example, to make room for one or more other tracks that are staged into primary cache 116. The invention provides a technique for determining which tracks are to be removed from primary cache 116.

Reading a track that is not in primary cache 116 requires a synchronous stage (i.e., copy of information from primary storage 112 to primary cache 116). The synchronous stage is very expensive and should be avoided as much as possible. Since reads tend to be clustered around the same location (e.g., the same track), a policy of clearing primary cache 116 space by demoting the least recently used (LRU) tracks from primary cache 116 may be optimal in some cases.

A remote mirroring system (RMS) track is a track that has been modified, but that has not been transferred to the secondary control unit 120 yet. In certain implementations, an RMS track is a "type" of a block of data. If an RMS track is demoted before being transferred to the secondary control unit 120, the demoted track will later have to be staged for the transfer. Again, this staging operation is expensive in terms of time and resources. In certain implementations, the least recently written RMS track is most likely to be accessed next for transfer to the secondary control unit 120.

Therefore, with implementations of the invention, RMS tracks are treated differently than tracks that are not waiting to be transferred to the secondary control unit 120. Tracks that are not waiting to be transferred to the secondary control unit 120 will be referred to herein as "normal tracks" or "non-RMS tracks" for ease of reference. In certain implementations, a normal track is a "type" of a block of data. RMS tracks are not demoted as long as there are at least a pre-specified number of normal tracks in primary cache 116 (i.e., the normal tracks meet or exceed a threshold). A count of the total number of normal tracks in primary cache 116 is maintained. In certain implementations, the threshold may be specified by a system administrator or other individual. When the count for the number of normal tracks falls below the threshold, RMS tracks may be demoted.

Figure 2:
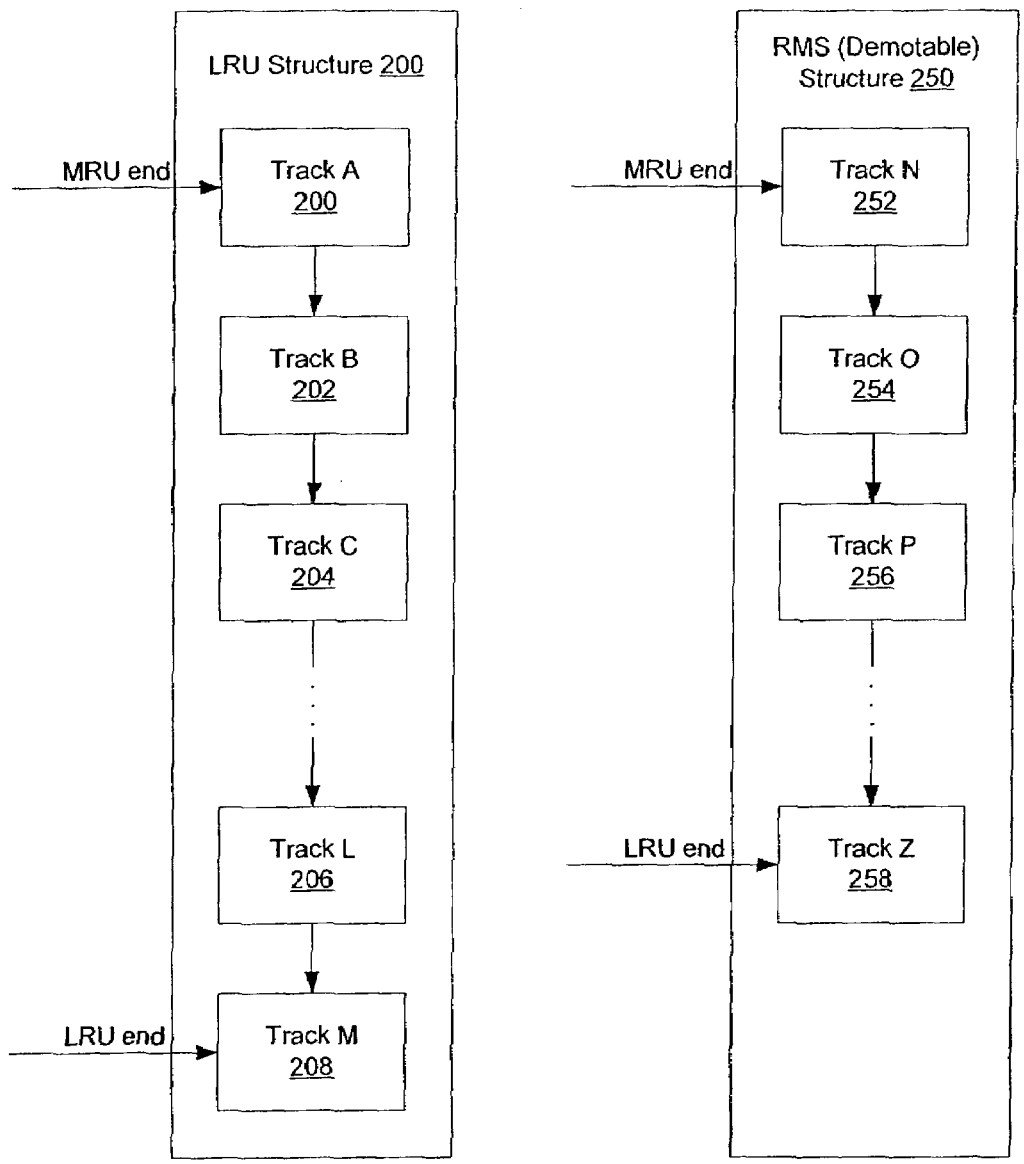
FIG. 2 illustrates a least recently used (LRU) structure and a remote mirroring system (RMS) structure in accordance with certain implementations of the invention.

FIG. 2 illustrates a least recently used (LRU) structure 200 (e.g., a list) and a remote mirroring system (RMS) structure 250 (e.g., a list) in accordance with certain implementations of the invention. For examples used herein, FIG. 2 illustrates an original state of LRU structure 200 and RMS structure 250.

When a track has been accessed (e.g., read, written or staged), the identifier for the track is placed in the LRU structure 200. Track identifiers are stored in the LRU structure 200 from least recently used to most recently used. For example, the LRU structure 200 includes identifiers for tracks A 200, B 202, C 204, L 206, and M 208. In this example, A 200 represents the most recently used end of LRU structure 200, and M 208 represents the least recently used end of the LRU structure 200. The ellipses indicate that other track identifiers may be in the LRU structure 200, but are not shown. The designation of an alphabetic character (e.g., A, B, C) for each track is for ease of reference. A track identifier in the LRU structure 200 may be for an RMS track for which demotion has not been attempted. When demotion of the RMS track is attempted, the RMS track's identifier may be placed in an RMS structure 250 in order to defer demotion of that RMS track. A total number of RMS tracks includes the RMS tracks on the LRU structure 200 and the RMS tracks on the RMS structure 250.

An RMS structure 250 includes identifiers for RMS tracks for which demotion has been deferred. For example, RMS structure 250 includes identifiers for RMS tracks N 252, O 254, P 256, and Z 258. The ellipses indicate that other tracks maybe in the RMS structure 250, but are not shown. The identifiers for RMS tracks are ordered based on a cache policy selected from a set of possible cache policies. For example, the RMS tracks may be ordered from least recently used to most recently used or may be ordered based on a penalty based cache policy. A penalty based cache policy is one that estimates the impact of removing the RMS track from primary cache 116 and that determines a penalty value for loss of each track. Then, a track's identifier is placed into the RMS structure 250 based on the penalty value. For instance, if it is likely that a read operation will read tracks within the same vicinity, a track that is in the vicinity of many other tracks that have recently been read may have a lower penalty than a track that is in the vicinity of many other tracks that have not been recently read, and the penalty value may be used to order the RMS structure 250. In this example, N 252 represents the most recently used end of RMS structure 250, and Z 258 represents the least recently used end of the RMS structure 250.

Figure 3A:
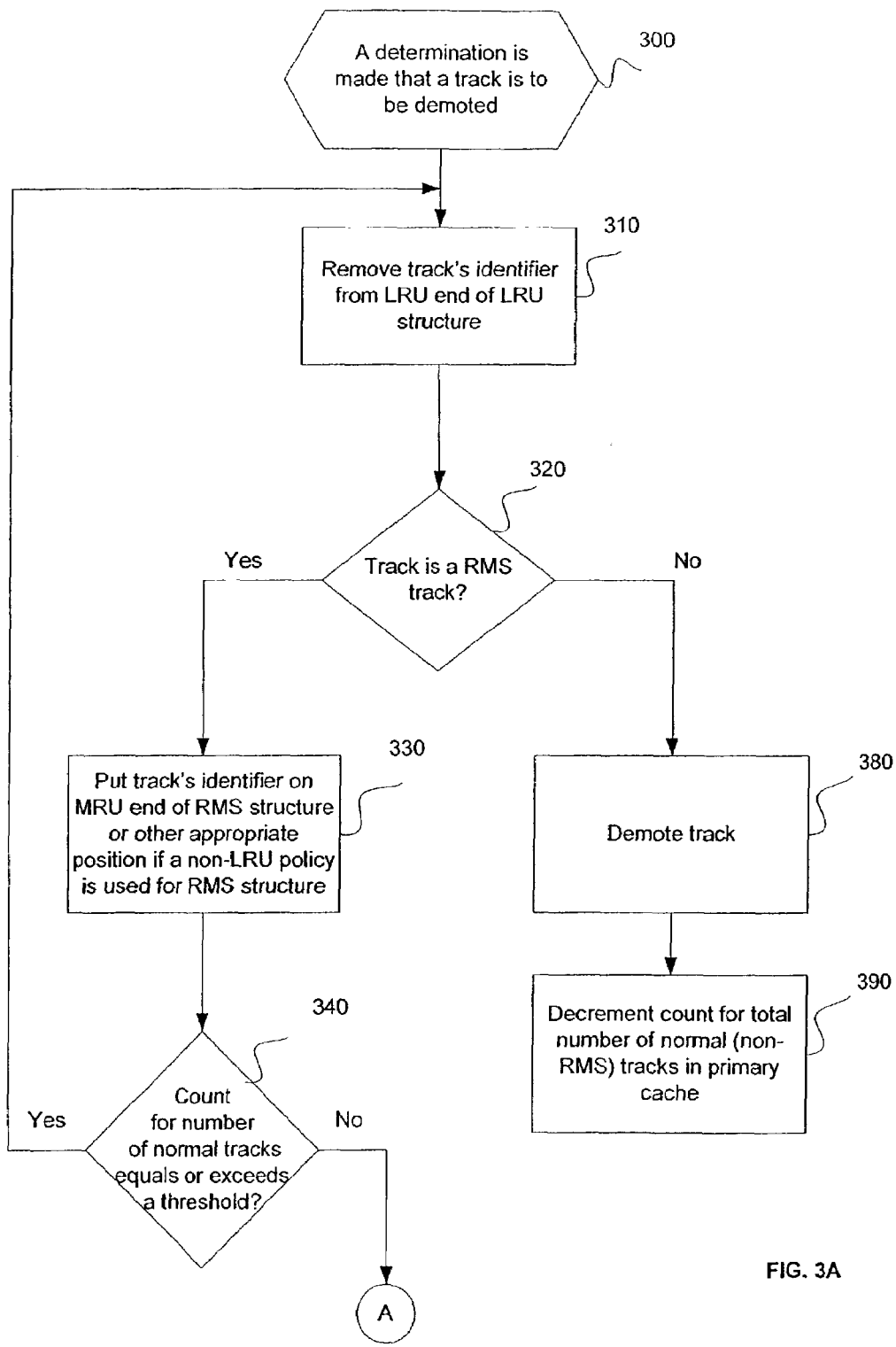
FIGS. 3A and 3B illustrate logic implemented in a demotion process when a track is demoted in accordance with certain implementations of the invention.
Figure 3B:
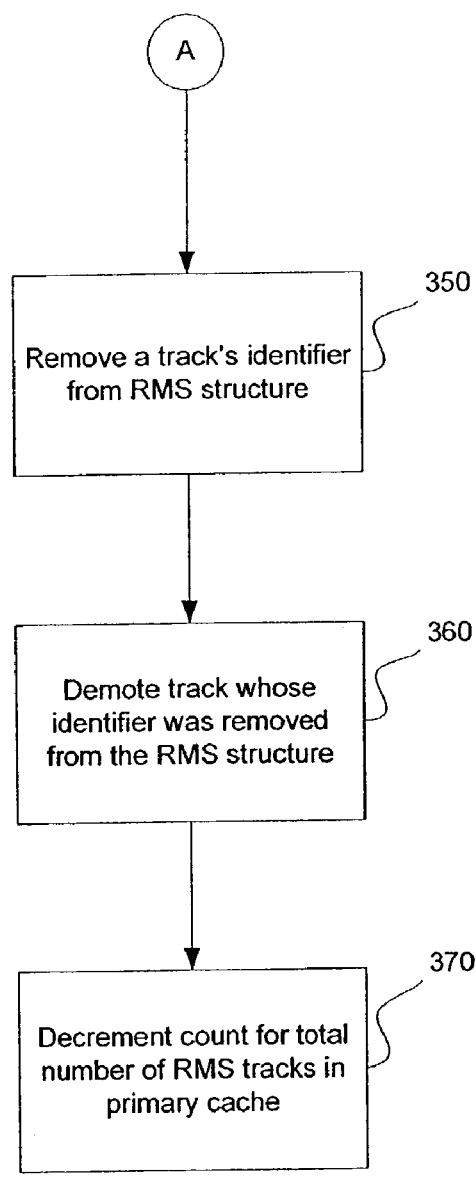

FIGS. 3A and 3B illustrate logic implemented in a demotion process 108 when a track is demoted in accordance with certain implementations of the invention. Control begins at block 300 with a determination being made that a track is to be demoted. In block 310, the track's identifier is removed from the least recently used end of the LRU structure 200. In block 320, it is determined whether the track is an RMS track. In certain implementations, the determination is made based on whether an indicator is set in an out of sync structure to indicate that the track has been modified since the track was last transferred to the secondary control unit 120. If the track is an RMS track, processing continues to block 330, otherwise, processing continues to block 380.

In block 330, the track's identifier is put in the RMS structure 250. If a least recently used or most recently used cache policy is implemented for the RMS structure 250, the track is added to the most recently used end of the RMS structure 250. If another cache policy is used, the track is added to an appropriate position in the RMS structure 250 based on that cache policy. In block 340, it is determined whether a count for a number of normal tracks equals or exceeds a threshold. If the threshold is met or exceeded, processing continues to block 310, to find another track for demotion. The track added to the RMS structure 250 is not removed from primary cache 116. If the threshold is not met or exceeded, processing continues to block 350.

In block 350, a track's identifier is removed from the RMS structure 250 to make room in primary cache 116 for another track. The selection of a track's identifier to be removed from the RMS structure 250 is based on the cache policy implemented for the RMS structure 250. The specific RMS track to be demoted may be determined using a variety of cache policies, such as a least recently used (LRU) cache policy, a most recently used (MRU) cache policy, or a penalty based cache policy. In certain implementations, for a LRU cache policy, a RMS track is added to the RMS structure 250 at the most recently used end, and a RMS track is demoted from the RMS structure 250 from the least recently used end. In certain implementations, for a MRU cache policy, a RMS track is added to the RMS structure 250 at the most recently used end, and a RMS track is demoted from the most recently used end. In certain implementations, for a penalty based cache policy, the RMS structure is ordered by a penalty value generated for each track, a RMS track is added to the RMS structure 250 based on the track's penalty value, and a track is removed from the RMS structure 250 from the least penalty end of the RMS structure 250. In certain other implementations, the RMS structure 250 may be ordered differently for a penalty based cache policy. In certain implementations, a RMS track is demoted from the RMS structure 250 based on penalty value, and so the track with the lowest penalty value is removed. In certain implementations, for any cache policy, rather than adding and removing tracks from ends of the RMS structure 250, the tracks may be added to or removed from other locations within the RMS structure 250.

For the penalty based cache policy, the penalty value may be assigned based on a quality of service standard or a geographic standard. For example, as to a quality of service standard, a higher penalty value may be assigned to data for a customer who has paid more money than others or otherwise holds a "Very Important Person" (VIP) status. Moreover, as to the geographic standard, a higher penalty may be assigned to data that is to be transferred to closer remote storage (e.g., secondary control unit 120). Many other techniques may be used in addition or instead to assign penalty values.

For example, in certain implementations, the track that has most recently been added to the RMS structure 250 may be removed. This may be done as the tracks added to the RMS structure 250 may be transferred to secondary storage 112 at secondary control unit 120 in the order in which they were added to the RMS structure 250. Therefore, track identifiers that have been in the RMS structure 250 for a longer period of time are more likely to be transferred before tracks that have been in the RMS structure 250 for a shorter period of time.

In block 360, the track removed from the RMS structure 250 is demoted. At demotion, memory associated with the track, as well as information about the track (e.g., a directory entry with information for the track) are removed. In block 370, a count for a number of RMS tracks in primary cache 116 is decremented.

If the track to be demoted is not an RMS track, in block 380, the track is demoted. In block 390, a count for the number of normal (non-RMS) tracks is decremented.

Figure 4:
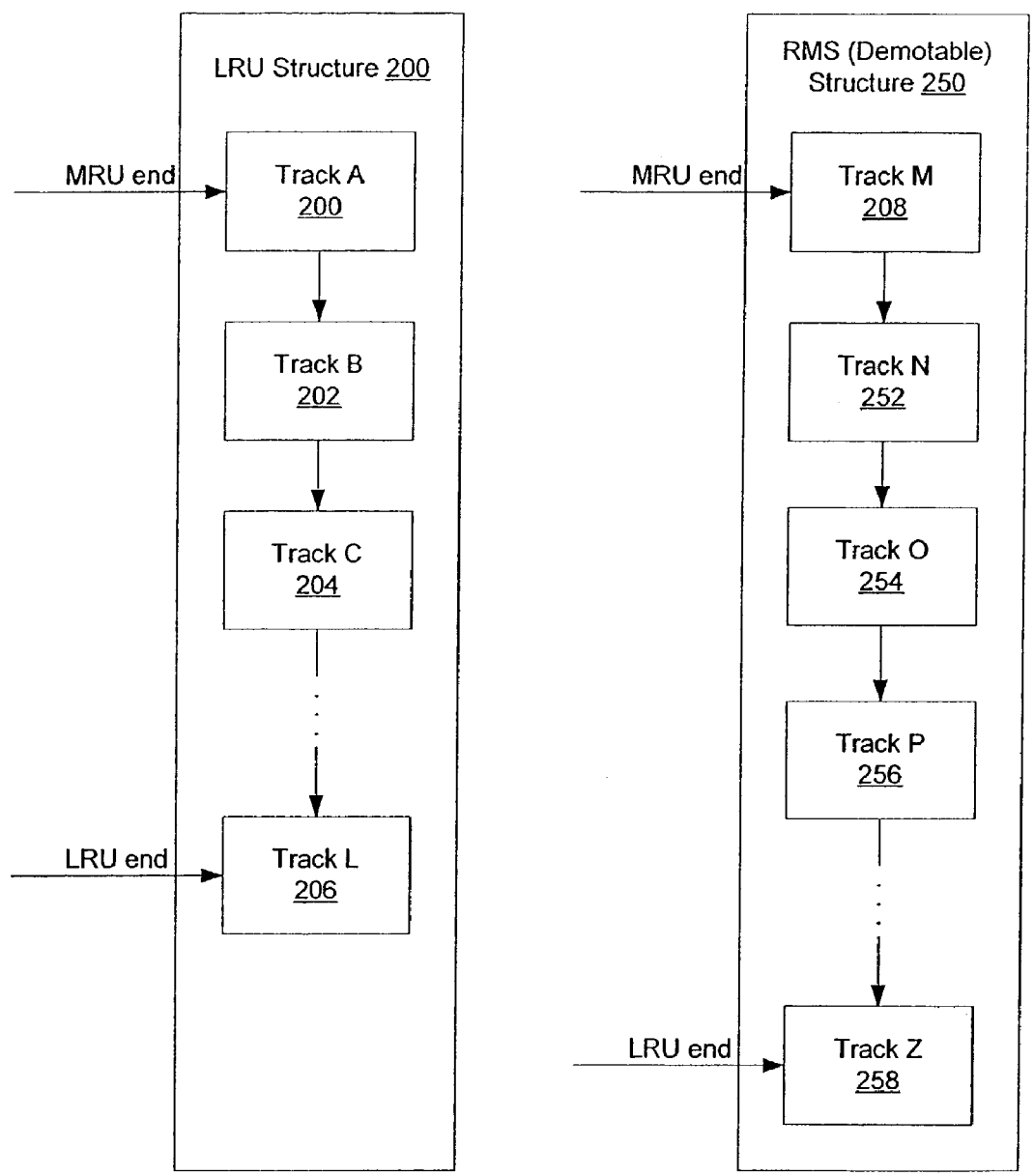
FIG. 4 illustrates a least recently used (LRU) structure and a remote mirroring system (RMS) structure after demotion of a track in accordance with certain implementations of the invention.

FIG. 4 illustrates a least recently used (LRU) structure 200 and a remote mirroring system (RMS) structure 250 after demotion of a track in accordance with certain implementations of the invention. In this example, when demotion for track M 208 was attempted, the count for the number of normal tracks exceeded a threshold, and the demotion for track M 208 was deferred. In this example, either a LRU cache policy or MRU cache policy is implemented. Relative to the original states of the LRU structure 200 and RMS structure 250 in FIG. 2, an identifier for track M 208 has been removed from the least recently used end of the LRU structure 200 and has been added to the most recently used end of the RMS structure 250 because track M 208 is a RMS track that was to be demoted.

Figure 5:
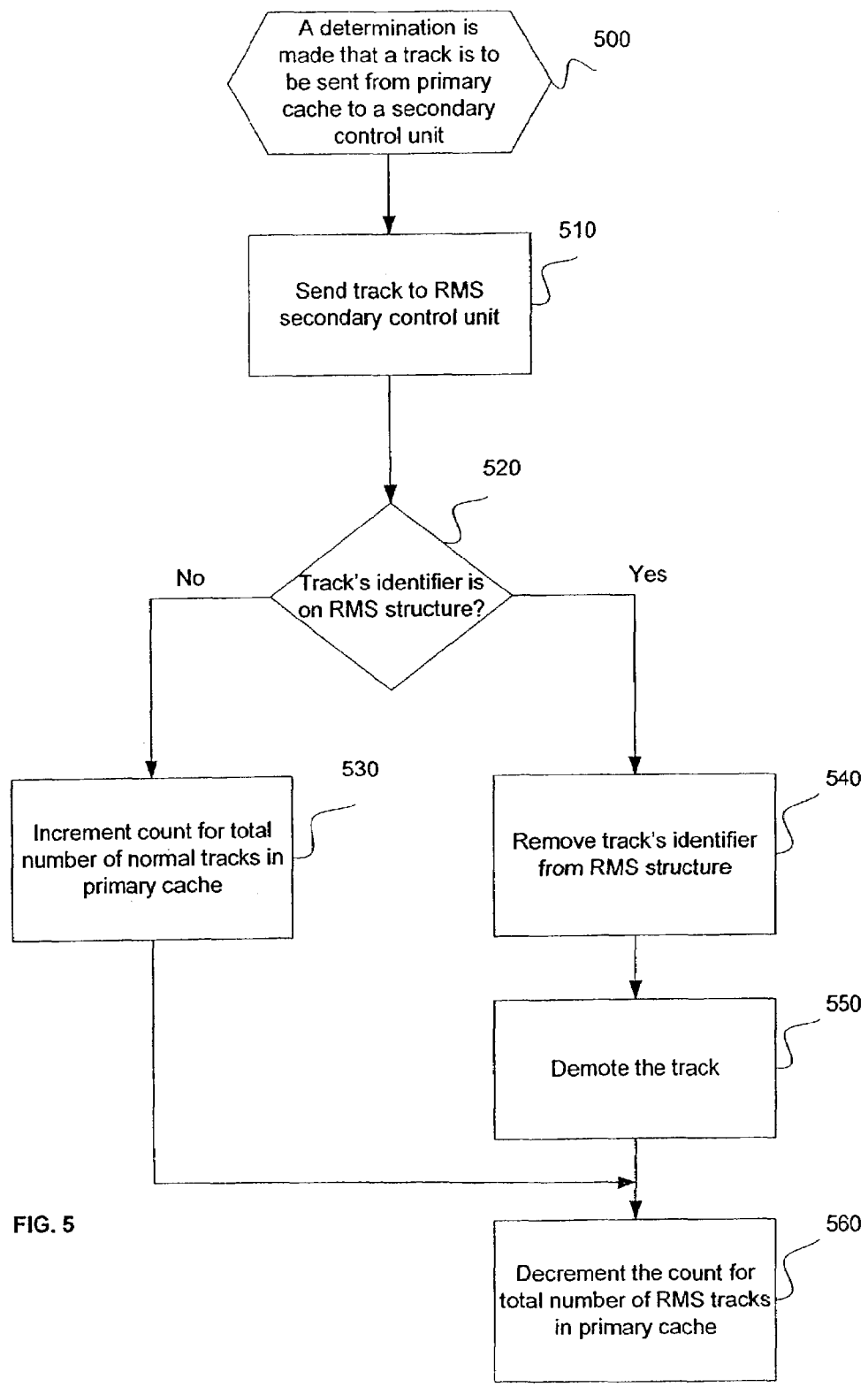
FIG. 5 illustrates logic implemented in a sync process when a track is transferred to a secondary control unit in accordance with certain implementations of the invention.

FIG. 5 illustrates logic implemented in a sync process 106 when a track is transferred to a secondary control unit in accordance with certain implementations of the invention. In certain implementations, the transfer is performed by the sync process 106. Control begins in block 500 with a determination being made that a track is to be sent from primary cache 116 to a secondary control unit 120. In block 510, a track is sent to the secondary control unit 120. In block 520, it is determined whether the track's identifier is in the RMS structure 250. If the track's identifier is in the RMS structure, processing continues to block 540, otherwise processing continues to block 530. In block 530, the count for the number of normal tracks in the primary cache 116 is incremented. That is, when a track is sent to the secondary control unit, the status of the track changes from being an RMS track to a normal track. This is because, by definition, an RMS track is one which is to be transferred. A track identifier in the LRU structure 200 may be an RMS track for which demotion has not been attempted. When demotion of the RMS track is attempted, the track's identifier is placed in the RMS structure 250. In block 540, the RMS track's identifier is removed from the RMS structure 250. In block 550, the track is demoted. In block 550, the count for the number of RMS tracks is decremented.

Figure 6:
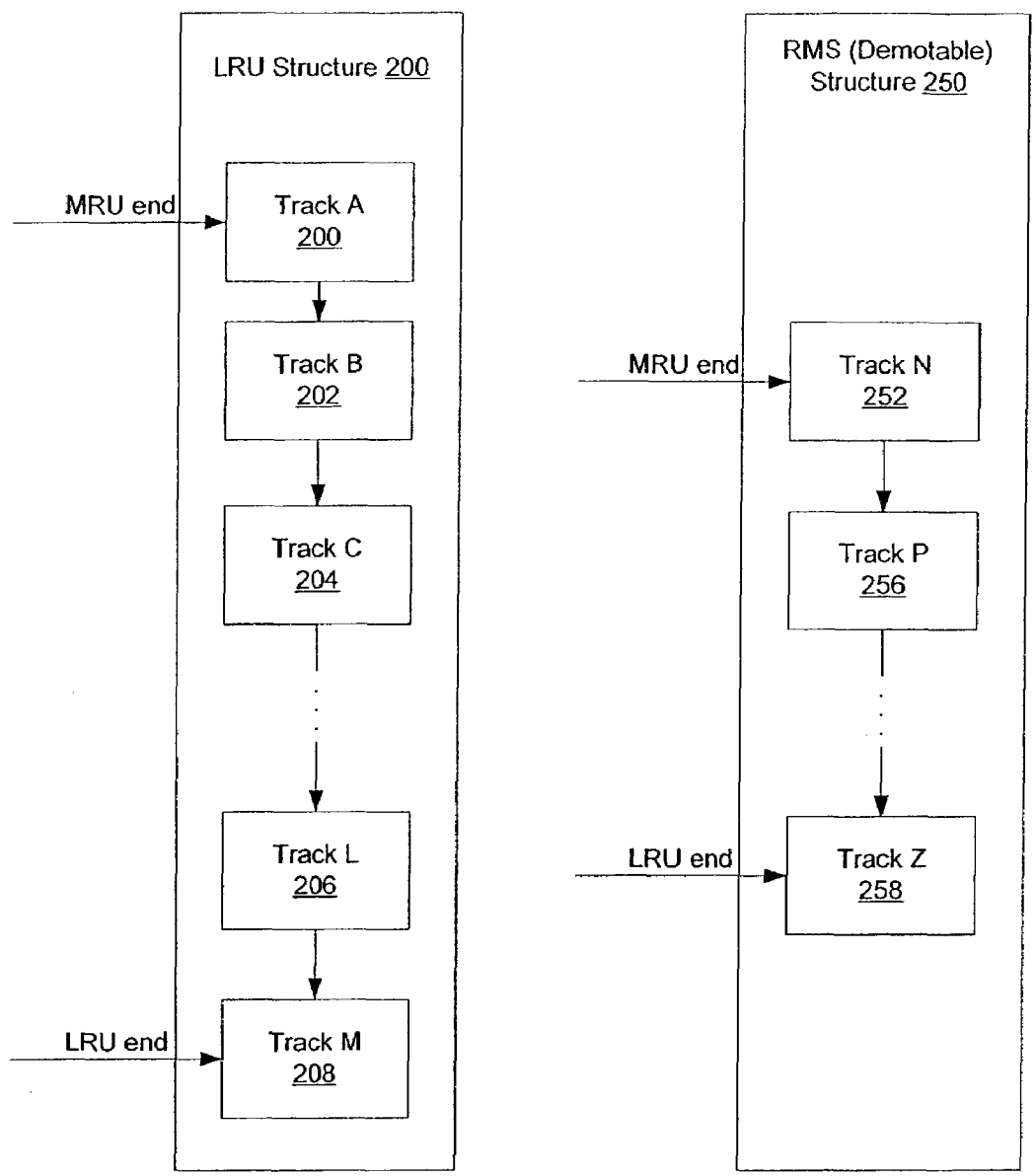
FIG. 6 illustrates a least recently used (LRU) structure and a remote mirroring system (RMS) structure after transfer of a track in accordance with certain implementations of the invention.

FIG. 6 illustrates a least recently used (LRU) structure and a remote mirroring system (RMS) structure after transfer of a track in accordance with certain implementations of the invention. Relative to the original states of the LRU structure 200 and RMS structure 250 in FIG. 2, in this example, track O 254 has been transferred, and so the identifier for track O has been removed from the RMS structure 250.

PPRC and ESCON are trademarks of International Business Machines, Inc.

ADDITIONAL IMPLEMENTATION DETAILS

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible from a file server over a network. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

At the primary control unit 100 and the secondary control unit 120, any central processing unit (CPU) and operating system known in the art may be used.

In certain implementations, for the penalty based cache policy, a track's identifier is placed into the RMS structure 250, and then, when a track's identifier is to be removed from the RMS structure 250, a penalty value is determined for each track whose identifier is in the RMS structure 250. Then, a track's identifier is placed into the RMS structure 250 based on the penalty value.

In certain implementations, all RMS tracks are stored in one RMS structure. In this case, a set amount of cache may be assigned to be shared by the LRU and RMS structures. In certain implementations, the size of the RMS structure in cache is static, and in certain other implementations the size of the RMS structure in cache is dynamic (e.g., the RMS structure size changes depending on the size of the LRU structure).

The logic of FIGS. 3A–3B and 5 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 3A–3B and 5 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Figure 7:
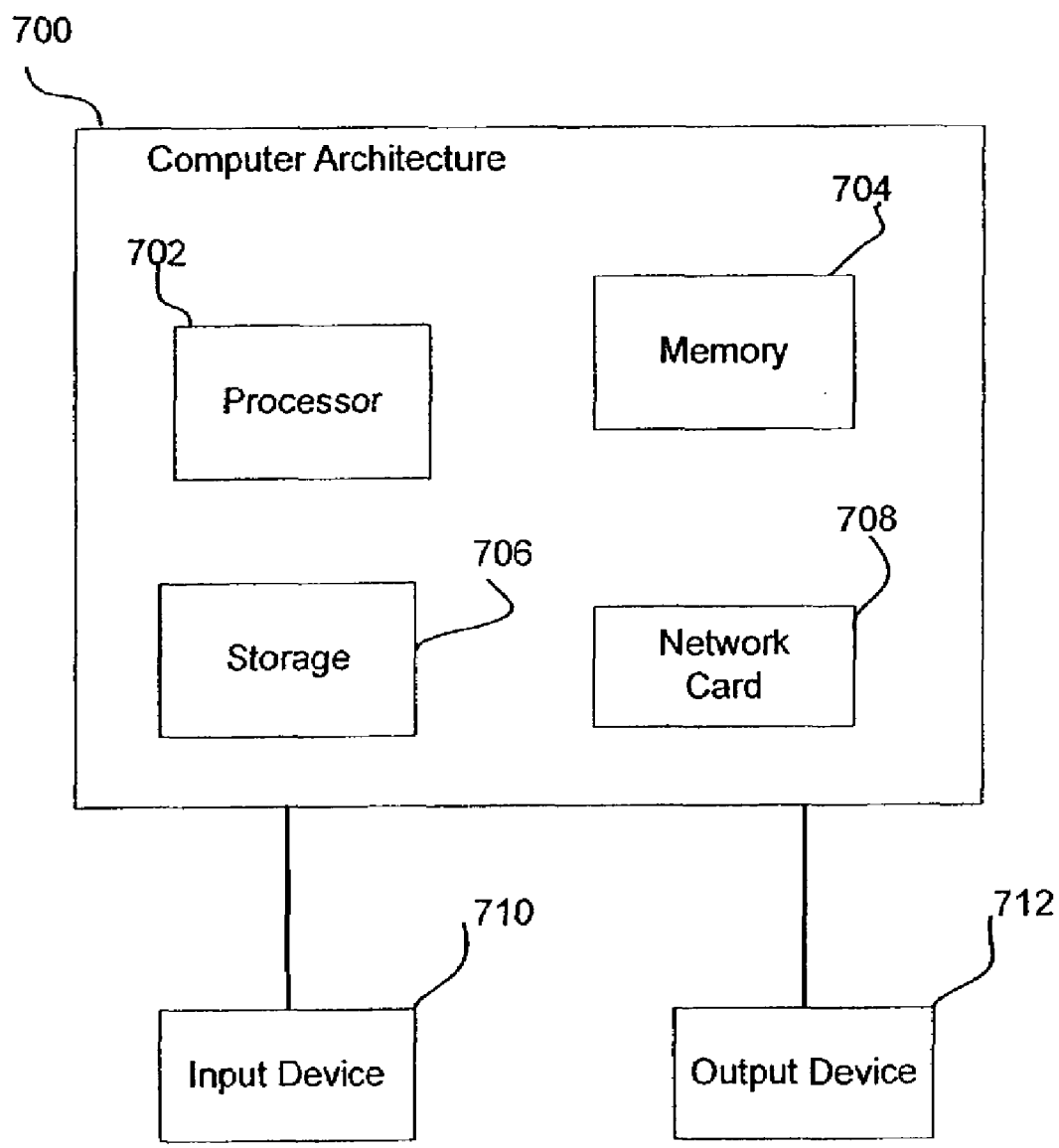
FIG. 7 illustrates one implementation of the architecture of computer systems in accordance with certain implementations of the invention.

FIG. 7 illustrates one implementation of the architecture of the computer systems 100 and 120 in accordance with certain implementations of the invention. The computer systems 100 and 120 may implement a computer architecture 700 having a processor 702 (e.g., a microprocessor), a memory 704 (e.g., a volatile memory device), and storage 706 (e.g., a non-volatile storage, such as magnetic disk drives, optical disk drives, a tape drive, etc.). The storage 706 may comprise an internal storage device or an attached or network accessible storage. Programs in the storage 706 are loaded into the memory 704 and executed by the processor 702 in a manner known in the art. The architecture further includes a network card 708 to enable communication with a network. An input device 710 is used to provide user input to the processor 702, and may include a keyboard, mouse, pen-stylus, microphone, touch sensitive display screen, or any other activation or input mechanism known in the art. An output device 712 is capable of rendering information transmitted from the processor 702, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A system for determining which data to remove from storage, comprising:
    means for using a first policy to determine when to remove a block of data of a first type, wherein the block of data of the first type comprises a normal block of data that is not waiting to be transferred to a remote storage; and
    means for using a second policy to determine when to remove a block of data of a second type, wherein the block of data of the second type comprises a block of data which is to be transferred to the remote storage;
    wherein a threshold is used to determine whether to remove a block of data of the first type or a block of data of the second type.

2. The system of claim 1, wherein the first policy comprises a least recently used cache policy.

3. The system of claim 1, wherein the second policy comprises a least recently used cache policy.

4. The system of claim 1, wherein the second policy comprises a most recently used cache policy.

5. The system of claim 1, wherein the second policy comprises a penalty based cache policy.

6. The system of claim 1, wherein the block of data of the second type further comprises a block of data for which demotion has been attempted.

7. A system of claim 1, further comprising:
    means for determining that a block of data is to be demoted from a first storage;
    means for, if a number of blocks of data of the first type equals or exceeds a threshold, removing a block of data of the first type; and
    means for, if a number of blocks of data of the first type is less than the threshold, removing a block of data of the second type.

8. A system for determining which data to remove from storage, comprising:
a first storage;
a second storage;
means for determining that a block of data is to be demoted from the first storage;
means for, if the block of data to be demoted is of a type that is to be transferred to the second storage and a number of normal blocks of data residing in the first storage equals or exceeds a threshold, deferring removal of the block of data;
means for, if the block of data to be demoted is of a type that is to be transferred to the second storage and the number of normal blocks of data residing in the first storage are less than a threshold, demoting a selected block of data, wherein a first policy is used to determine the selected block of data that is to be removed; and
means for, if the block of data to be demoted is of a type that is not to be transferred to the secondary storage, demoting a selected block of data, wherein a second policy is used to determine the selected block data that is to be removed.

9. The system of claim 8, further comprising:
means for transferring the block of data whose demotion was deferred to the second storage; and
means for demoting the block of data.

10. A method for determining which data to remove from storage, comprising:
using a first policy to determine when to remove a block of data of a first type, wherein the block of data of the first type comprises a normal block of data that is not waiting to be transferred a remote storage; and
using a second policy to determine when to remove a block of data of a second type, wherein the block of data of the second type comprises a block of data which is to be transferred to the remote storage;
wherein a threshold is used to determine whether to remove a block of data of the first type or a block of data of the second type.

11. The method of claim 10, wherein the first policy comprises a least recently used cache policy.

12. The method of claim 10, wherein the second policy comprises a least recently used cache policy.

13. The method of claim 10, wherein the second policy comprises a most recently used cache policy.

14. The method of claim 10, wherein the second policy comprises a penalty based cache policy.

15. The method of claim 10, wherein the block of data of the second type further comprises a block of data for which demotion has been attempted.

16. A method of claim 10, further comprising:
determining that a block of data is to be demoted from a first storage;
if a number of blocks of data of the first type equals or exceeds a threshold, removing a block of data of the first type; and
if a number of blocks of data of the first type is less than the threshold, removing a block of data of the second type.

17. A method for determining which data to remove from storage, comprising:
determining that a block of data is to be demoted from a first storage;
if the block of data to be demoted is of a type that is to be transferred to a second storage and a number of normal blocks of data residing in the first storage equals or exceeds a threshold, deferring removal of the block of data;
if the block of data to be demoted is of a type that is to be transferred to the second storage and the number of normal blocks of data residing in the first storage are less than a threshold, demoting a selected block of data, wherein a first policy is used to determine the selected block of data that is to be removed; and
if the block of data to be demoted is of a type that is not to be transferred to the secondary storage, demoting a selected block of data, wherein a second policy is used to determine the selected block of data that is to be removed.

18. The method of claim 17, further comprising:
transferring the block of data whose demotion was deferred to the second storage; and
demoting the block of data.

19. An article of manufacture embodied as a computer readable medium for determining which data to remove from storage, wherein the article of manufacture includes executable code which causes operations, the operations comprising:
using a first policy to determine when to remove a block of data of a first type, wherein the block of data of the first type comprises a normal block of data that is not waiting to be transferred to a remote storage; and
using a second policy to determine when to remove a block of data of a second type, wherein the block of data of the second type comprises a block of data which is to be transferred to the remote storage;
wherein a threshold is used to determine whether to remove a block of data of the first type or a block of data of the second type.

20. The article of manufacture of claim 19, wherein the first policy comprises a least recently used cache policy.

21. The article of manufacture of claim 19, wherein the second policy comprises a least recently used cache policy.

22. The article of manufacture of claim 19, wherein the second policy comprises a most recently used cache policy.

23. The article of manufacture of claim 19, wherein the second policy comprises a penalty based cache policy.

24. The article of manufacture of claim 19, wherein the block of data of the second type further comprises a block of data for which demotion has been attempted.

25. A article of manufacture of claim 19, the operations further comprising:
determining that a block of data is to be demoted from a first storage;
if a number of blocks of data of the first type equals or exceeds a threshold, removing a block of data of the first type; and
if a number of blocks of data of the first type is less than the threshold, removing a block of data of the second type.

26. An article of manufacture embodied as a computer readable medium for determining which data to remove from storage, wherein the article of manufacture includes executable code which causes operations, the operations comprising:
determining that a block of data is to be demoted from a first storage;
if the block of data to be demoted is of a type that is to be transferred to a second storage and a number of normal blocks of data residing in the first storage equals or exceeds a threshold, deferring removal of the block of data;

if the block of data to be demoted is of a type that is to be transferred to the second storage and the number of normal blocks of data residing in the first storage are less than a threshold, demoting a selected block of data, wherein a first policy is used to determine the selected block of data that is to be removed; and if the block of data to be demoted is of a type that is not to be transferred to the secondary storage, demoting a selected block of data, wherein a second policy is used to determine the selected block of data that is to be removed.

27. The article of manufacture of claim 26, the operations further comprising:

transferring the block of data whose demotion was deferred to the second storage; and demoting the block of data.

* * * * *